United States Patent [19]

Sasaki et al.

[11] Patent Number: 4,812,861
[45] Date of Patent: Mar. 14, 1989

[54] OPTICAL LASER BEAM CONTROL DEVICE FOR PRINTER

[75] Inventors: Yoshikazu Sasaki, Sagamihara; Naoya Misawa, Yamato, both of Japan

[73] Assignee: Minolta Camera Kabushiki Kaisha, Osaka, Japan

[21] Appl. No.: 88,048

[22] Filed: Aug. 21, 1987

[30] Foreign Application Priority Data

Aug. 21, 1986 [JP] Japan ............................. 61-196285

[51] Int. Cl.$^4$ .......................................... G01D 15/14
[52] U.S. Cl. ....................................... 354/4; 346/108
[58] Field of Search .................... 354/4, 5, 7; 346/108

[56] References Cited

U.S. PATENT DOCUMENTS 3,610,119  10/1971  Gerber et al. ........................... 354/4

Primary Examiner—Michael L. Gellner
Attorney, Agent, or Firm—Price, Gess & Ubell

[57] ABSTRACT

A laser beam control device related to the present invention includes an optical filter in the path of propagation of the laser beam from a laser light source to an image forming surface to form an image with the laser beam transmitted through the filter, and controls the transmittance of the filter based on the result obtained by detecting the intensity of the transmitted laser beam and comparing the detected value with a value of image density set by an operator.

12 Claims, 8 Drawing Sheets

OPTICAL LASER BEAM CONTROL DEVICE FOR PRINTER

BACKGROUND OF THE INVENTION

1. Field of the Invention

The present invention relates to a laser beam control device, and more particularly to a laser beam control device for use in laser beam printers which is capable of optically adjusting the intensity of a laser beam, i.e. the density of images, on the image forming plane or surface.

2. Description of the Prior Art

Laser beam printers are generally adapted to project a laser beam on a photosensitive material providing an image forming surface to form images thereon. Such laser beam printers must have the function of shifting the intensity range of the laser beam, i.e. the function of varying the image density, on the image forming surface to offset the variations in the performance of laser light sources from lot to lot or in the sensitivity of photosensitive material from lot to lot, and to meet the needs of the user. The intensity range of the laser beam is shiftable on the image forming surface by adjusting the input signal to be fed to the drive circuit for driving the laser beam light source (such as a laser diode) and thereby varying the intensity of the laser beam to be emitted by the light source, but this method has the drawback of necessitating a complex video signal generating circuit for feeding the signal to the drive circuit. Accordingly, some conventional printers are adapted to shift the intensity range of the laser beam on the image forming surface by providing a polarizing filter or the like in the path of the laser beam from the light source to the image forming surface and rotating the filter or the like about its optical axis, without varying the intensity of the laser beam to be emitted by the light source.

Figure 6:
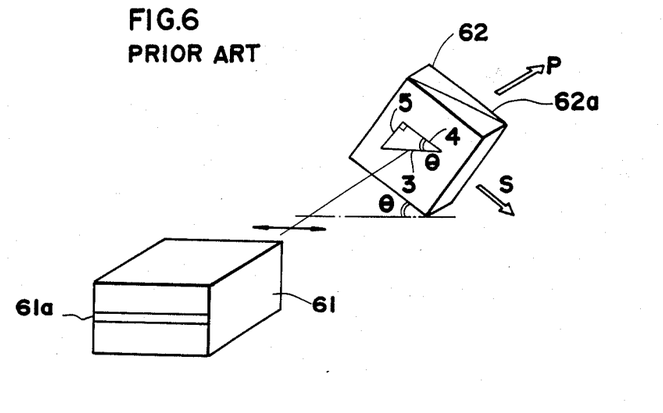
FIG. 6 is a diagram illustrating the principle of a method of shifting the intensity range of a laser beam by a polarizing beam splitter.
Figure 7:
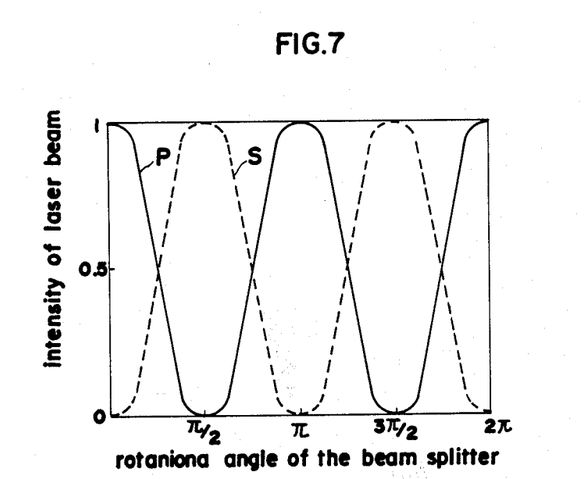
FIG. 7 is a graph showing the relation of the rotational angle of the beam splitter shown in FIG. 6 to the intensity of the transmitted laser beam, as well as to that of the reflected beam.

FIG. 6 shows the principle of shifting the light intensity range by a polarizing filter. Indicated at 61 in the drawing is a laser diode used as the laser light source, and at 62 a polarizing beam splitter serving as the polarizing filter. The laser beam emitted by the laser diode 61 is linearly polarized in a direction parallel to the active layer 61a of the laser diode 61. The polarizing beam splitter 62 has the characteristics of transmitting a component P of the incident beam (the component indicated at 4 in the drawing and having an electric field vibrating in a plane perpendicular to a reflecting plane 62a) and reflecting a component S (indicated at 5 and having an electric field vibrating in a plane parallel to the reflecting plane 62a). Accordingly, when the beam splitter 62 as positioned to give the maximum transmittance is rotated about its optical axis, the intensity of the laser beam passing through the splitter 62 periodically varies with the angle of rotation of the splitter 62. The amplitude of the laser beam through the beam splitter 62 is in proportion to $\cos \theta$ wherein $\theta$ is the angle of rotation of the splitter 62 from a reference position. The intensity of the transmitted beam is proportional to $\cos^2 \theta$. FIG. 7 is a graph showing the relation of the rotational angle of the beam splitter 62 to the intensity of the transmitted beam, as well as to that of the reflected beam. In this graph, the intensity of the transmitted beam is indicated in a solid line, and that of the reflected beam in a broken line.

Figure 8:
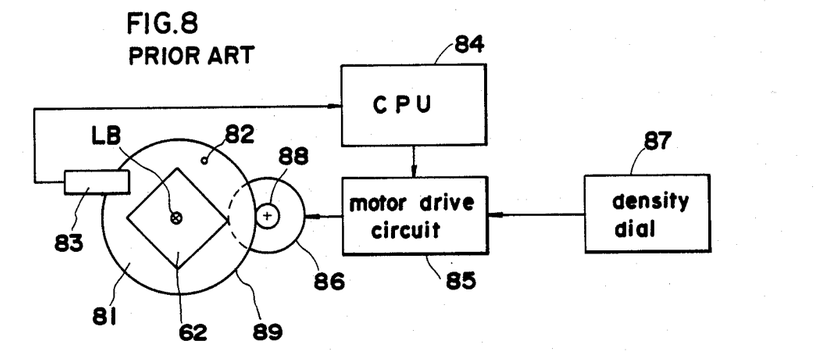
FIG. 8 is a block diagram showing a circuit for controlling the driving rotation of a beam splitter included in a conventional laser beam printer.

FIG. 8 is a block diagram of a control circuit for driving a laser beam splitter included in the conventional laser beam printer employing the above method.

The polarizing beam splitter 62 is embedded in the center of a rotatable base 81 in the form of a disk. A laser beam LB propagating toward the plane of the drawing is incident on the laser beam splitter 62, and the transmitted light is projected on a photosensitive material to form an image thereon. The base 81 is formed with a hole 82 showing a reference position (generally the position of $\theta = 0$ in FIG. 6) of the splitter 62. When the beam splitter 62 is in the reference position, the hole 82 is detected by a photosensor 83, which feeds a detection signal to a CPU 84 for the CPU 84 to detect that the beam splitter 62 is in the reference position. The CPU 84 feeds an enable signal to a motor drive circuit 85, thereby allowing the operation of the circuit 85. A stepping motor 86 is connected to the output side of the drive circuit 85, and a density dial 87 on the operation panel to the input side thereof. A drive gear 88 mounted on the output shaft of the stepping motor 85 is in mesh with teeth 89 formed along the periphery of the disklike base 81 for rotating the beam splitter 62 about its optical axis to vary the intensity of beam on the image forming surface. On the other hand, the density dial 87 on the operation panel can be manipulated to adjust the image density from a minimum to a maximum in 8 to 16 steps. In accordance with a particular density selected, the dial 87 feeds a signal to the motor drive circuit 85. In response to the signal from the density dial 87, the circuit 85 drives the motor 86 to adjust the intensity of the transmitted laser beam through the splitter 62 to give the desired image density.

Figure 9:
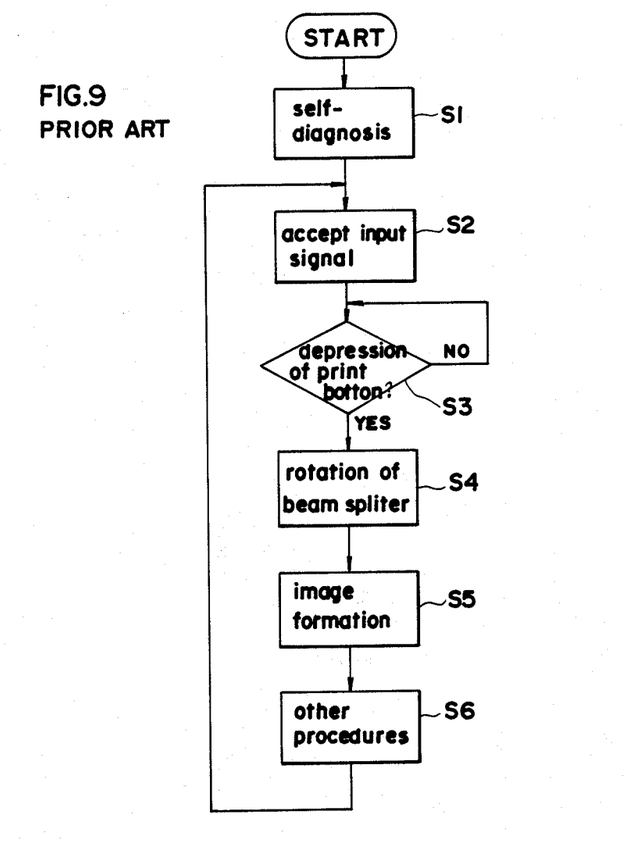
FIG. 9 is a flow chart showing the operation process of the conventional laser beam printer of FIG. 8.

FIG. 9 is a flow chart showing the operation process of the conventional laser beam printer of FIG. 8. When the power supply for the printer is turned on, a self-diagnosis is executed (step S1) for the printer itself to check the operation and the state of its components. As a procedure for the self-diagnosis, the motor drive circuit 85 rotates the beam splitter 62 to bring the splitter 62 to the reference position. The self-diagnosis, when completed, renders the printer ready for printing. The density dial 87, etc. on the operation panel are manipulated to give input signals (step S2). Subsequently, preparation of a photosensitive material, preparation of video input from the host computer, etc. are completed. When depression of the print button by the user is thereafter detected (step S3), the CPU 84 feeds an enable signal to the motor drive circuit 85, which in turn rotates the polarizing beam splitter 62 in accordance with the setting of the density dial 87 (step S4). The laser diode is then driven in accordance with the video signal to form an image on the photosensitive material (step S5). Step S6 follows for the development of the image bearing photosensitive material and other procedures.

With the conventional laser beam printer described above, the rotation of the beam splitter is so controlled that the beam splitter is merely rotated through a specified angle according to the value set by the operator with the density dial. Because of this mode of control which is so-called open-loop control, the operator must adjust the density dial in view of the performance of the laser light source which differs from lot to lot or the sensitivity of the photosensitive material which also differs from lot to lot, hence a cumbersome procedure.

Further semiconductor lasers (e.g., laser diodes) emit a laser beam the intensity of which varies with variations in the temperature of the laser itself, so that the laser beam printer incorporating a semiconductor laser as the laser light source requires the adjustment of the dsenity dial every time the ambient temperature or the like varies. This makes the above-drawback more serious.

Further in the case of color laser beam printers for forming color images using a plurality of laser light sources, the light sources must be provided with respective beam splitters. The conventional method of controlling the rotation of the beam splitter in the open-loop mode described above then has the drawback that the color balance can not be corrected delicately.

SUMMARY OF THE INVENTION

Accordingly, the main object of the present invention is to provide a laser beam printer which is made easy to operate by being adapted to vary the intensity of the laser beam, i.e. to vary the image density, on the image forming surface by a simple procedure.

Another object of the invention is to provide a laser beam printer equipped with an optical laser beam control device for enabling the operator to set the desired image density without the necessity of considering the performance of the laser light source which is likely to differ from lot to lot.

Another object of the invention is to provide a laser beam printer equipped with an optical laser beam control device which eliminates the need for the operator to set the density every time the ambient temperature varies.

Another object of the invention is to provide a laser beam printer equipped with an optical laser beam control device which fulfills the above objects by a simple construction without necessitating a complex video signal generating circuit.

Another object of the invention is to provide an optical laser beam control device suitable for use in color laser beam printers for forming color images.

Still another object of the invention is to provide an optical control device which assures facilitated color balance correction.

These and other objects of the present invention can be fulfilled by providing an optical filter in the path of propagation of a laser beam from a laser light source to an image forming surface to form an image with the laser beam transmitted through the filter, and controlling the transmittance of the filter based on the result obtained by detecting the intensity of the transmitted laser beam and comparing the detected value with a value of image density set by the operator.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE INVENTION

Embodiments of the present invention will be described below with reference to the drawings concerned. The present invention is applied to common laser beam printers which are similar in overall construction to the one disclosed in European Patent Publication No. 0146813. The present specification includes the disclosure thereof.

Figure 1:
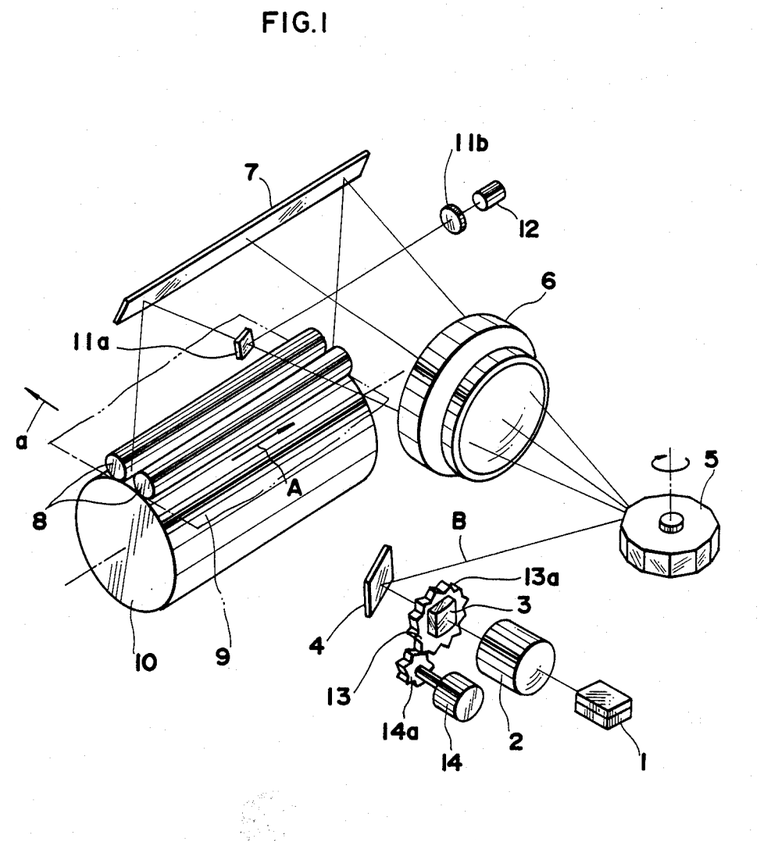
FIG. 1 is a perspective view of the image forming unit of a laser beam printer embodying the invention.

FIG. 1 is a perspective view showing the image forming unit of a laser beam printer embodying the invention. The drawing shows a laser diode 1 for emitting a laser beam the quantity of which is modulated according to a video signal given by an unillustrated video signal source to obtain a multi-tone image, a collimator lens 2 for collimating the laser beam emitted by the diode 1, a polarizing beam splitter 3 for varying the intensity range of the laser beam on an image forming surface, a reflecting mirror 4, a polygon mirror 5 which is rotatable for scanning the image forming surface with the laser beam in the direction of arrow A, an F/θ lens 6 and a reflecting mirror 7. The laser beam reflected from the mirror 7 is projected on a photosensitive material 9 between rollers 8, 8 of small diameter. The material 9 is transported between a roller 10 of large diameter and the rollers 8, 8 of small diameter in the direction of arrow a. While being scanned with the laser beam in the direction A, the photosensitive material 9 itself is transported in the direction a, whereby an image is formed on the material 8 corresponding to the optical modulation of the laser diode 1.

A mirror 11a is disposed in the optical path for the beam at the scan starting side thereof. The laser beam reflected at the mirror 11a is detected by a photosensor 12 through a lens 11b. The sensor 12 is used for detecting the timing for starting image formation. The modulation of the laser beam is initiated a predetermined period of time after the laser beam is detected by the photosensor 12.

Figure 2:
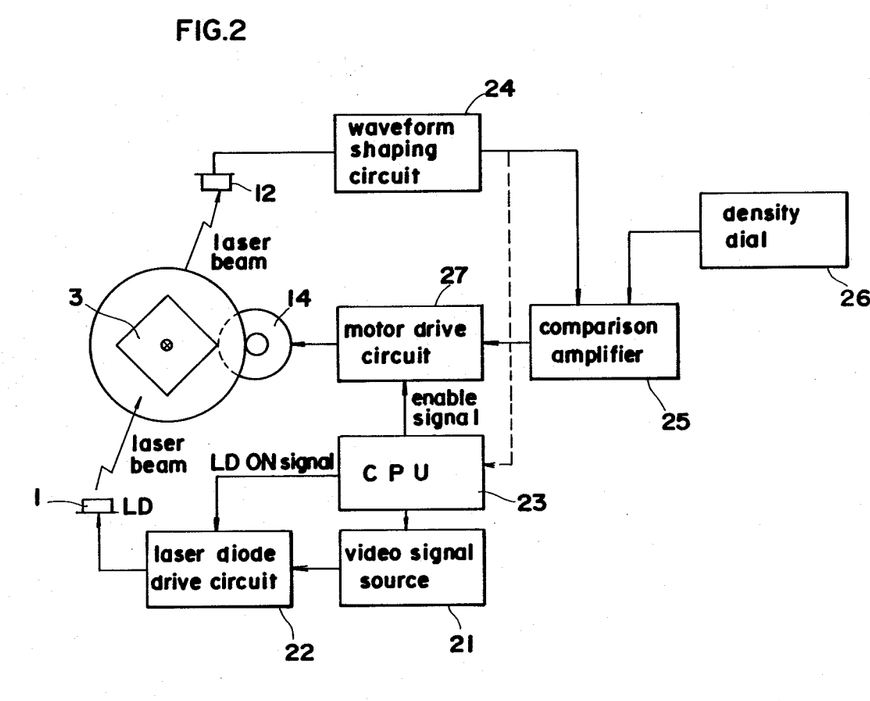
FIG. 2 is a block diagram showing a circuit for controlling the driving rotation of a beam splitter included in the laser beam printer of FIG. 1.

The beam splitter 3 is provided at the center of a disklike base 13 formed with teeth 13a along its outer periphery as in the prior art. The toothed periphery 13a of the base 13 is in mesh with a drive gear 14a on a servomotor 14. Rotation of the servomotor 14 rotates the beam splitter 3 about the optical axis to vary the range of beam intensities on the image forming surface. The amount of rotation of the beam splitter 3 about the optical axis, in other words, the intensity of the laser beam transmitted through the beam splitter 3, is detected by the sensor 12, which in turn feeds a detection signal to a control circuit as shown in FIG. 2. FIG. 2 shows a video signal source 21 and a laser diode drive circuit 22, which receives an LD ON signal from a CPU 23 and thereafter causes the laser diode 1 to emit a laser beam in accordance with a video signal from the signal source 21. During the adjustment of intensity of the laser beam, the video signal is maintained at a definite level. According to the present embodiment, the signal is maintained at such a definite level as is required for the laser diode to produce one-half of its maximum power output. With the operation of the laser diode 1, the laser beam passing through the beam splitter 3 in a direction perpendicular to the plane of FIG. 2 is partially converted by the sensor 12 into an electric signal in accordance with the intensity of the beam. The signal has its waveform shaped by a waveform shaping circuit 24 and is applied to one input terminal of a comparison amplifier 25. A signal corresponding to the setting of a density dial 26 is applied to the other input terminal of the comparison amplifier 25. The density dial 26 is manipulated by the operator to adjust the image density, i.e. the intensity of the laser beam to be projected on the photosensitive material, feeding an electric signal in accordance with the intensity setting to the amplifier 25. The comparison amplifier 25 delivers a signal representing the difference between the two input signals to a motor drive circuit 27. The servomotor 14 therefore rotates the beam splitter 3 until the output of the amplifier 25 diminishes to zero, that is, until the intensity detected by the photosensor 12 becomes equal to the value set by the density dial 26. Thus, the light intensity range is adjustable to accurately match the setting of the density dial 26. The motor drive circuit 27 is made ready for operation by an enable signal from the CPU 23 to control the adjustment of the intensity range. The signal line indicated in a broken line in FIG. 2, although not used for this adjustment, serves as a transmission line for an image start timing signal when an image is to be formed.

Figure 3:
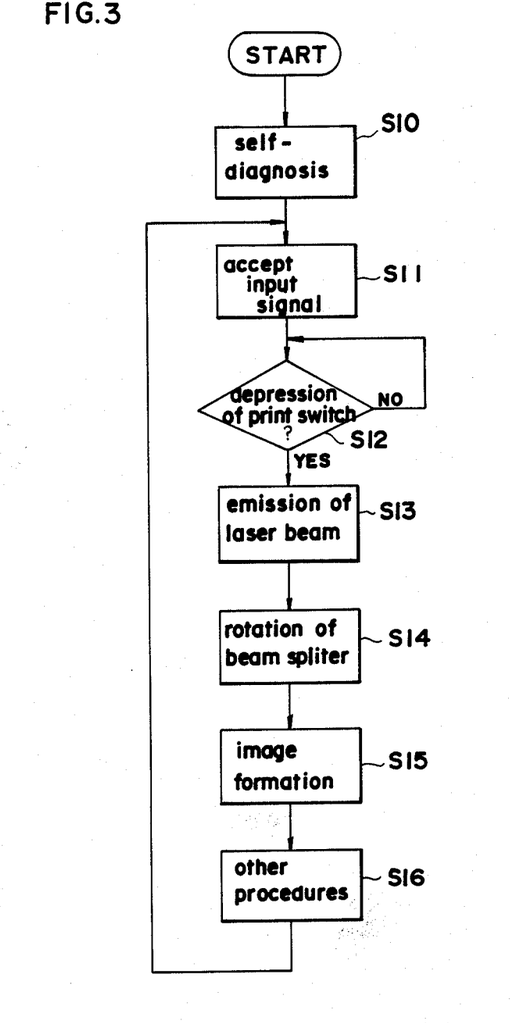
FIG. 3 is a flow chart showing the operation process of the laser printer of FIG. 1.

Preferably, the adjustment of light intensity range is made before the start of image formation. FIG. 3 is a flow chart showing the operation process of the laser beam printer including such light intensity range adjustment. When the printer power supply is turned on, a self-diagnosis is executed in step S10 for the printer to check the state of its components. Although the self-diagnosis by the conventional laser beam printer shown in FIG. 9 involves positioning of the beam splitter in its reference position, the beam splitter of the laser beam printer of the invention need not be so positioned because the intensity of the laser beam through the polarizing beam splitter is detected by the sensor 12 and fed back to the motor drive circuit via the comparison amplifier, causing the beam splitter to rotate by an amount accurately corresponding to the density dial setting. Completion of the self-diagnosis renders the laser beam printer ready for printing, and the printer accepts inputs from the density dial, etc. on the operation panel (step S11). Subsequently, depression of the print switch (not shown) is detected in step S12, whereupon step S13 and S14 follow before image formation to drive the beam splitter 3 for controlled rotation. Stated more specifically, the CPU 23 feeds an LD ON signal to the laser diode drive circuit 22, and the video signal source 21 emits a video signal, causing the laser diode 1 to emit a laser beam with one-half the maximum power. The CPU 23 thereafter gives an enable signal to the motor drive circuit 27, rendering this circuit 27 ready for operation. Consequently, the motor drive circuit 27 drives the servomotor 14 to rotate the beam splitter 3 until the intensity of the laser beam detected by the photosensor 12 becomes equal to the image density set by the density dial 26. In this way, the beam splitter 3 is rotated to the position corresponding to the setting of the density dial 26, whereupon the enable signal is discontinued. Step S15 is then performed to form an image. Step S16 thereafter follows for the development of the image bearing photosensitive material and other procedures. While the beam splitter 3 is in controlled rotation in steps S13 and S14, the polygon mirror 5 may be so positioned as to make the laser beam incident on the photosensor 12, and after the completion of the beam splitter 3, the polygon mirror 5 may be rotated to initiate the image forming step. Alternatively, the beam splitter 3 may be driven for controlled rotation while holding the polygon mirror 5 in rotation, with a peak holding circuit interposed between the waveform shaping circuit 24 and the comparison amplifier 25.

Figure 4:
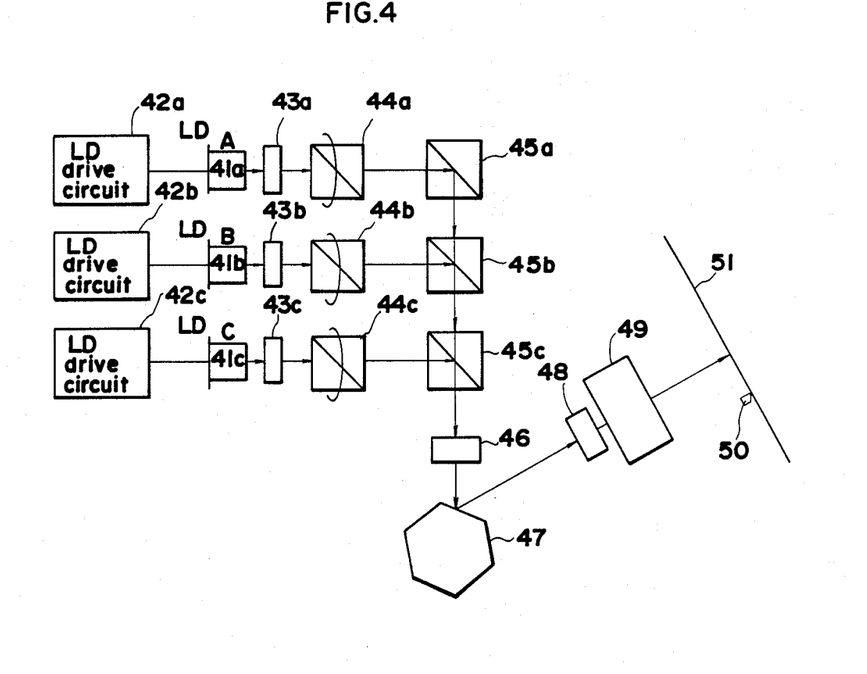
FIG. 4 is a diagram schematically showing the construction of a color laser beam printer embodying the invention.

FIG. 4 shows another embodiment of the invention, i.e., a color laser beam printer incorporating laser diodes 41a, 41b, 41c for emitting laser beams which are different in wavelength. The drawing shows laser diode drive circuits 42a, 42b, 42c, collimator lenses 43a, 43b, 43c, polarizing beam splitters 44a, 44b, 44c, beam splitters 45a, 45b, 45c, a cylindrical lens 46, a polygon mirror 47, a toroidal lens 48, an $f\theta$ lens 49, a photosensor 50 for detecting image forming timing and for detecting the intensity of each laser beam, and a photosensitive material for forming an image thereon. The laser beams emitted by the laser diodes 41a, 41b, 41c correspond to respective colors and impinge on the polarizing beam splitters 44a, 44b, 44c through the collimator lenses 43a, 43b, 43c. Each of the polarizing beam splitters 44a, 44b, 44c is rotatable about its otical axis by the same arrangement as included in the first embodiment of FIGS. 1 and 2, and the intensity of the transmitted beam is adjusted by the rotation. The laser beams through the polarizing beam splitters 44a, 44b, 44c are directed by the beam splitters 45a, 45b, 45c and the cylindrical lens 46, then reflected by the polygon mirror 47 rotating at a high speed and caused by the mirror 47 to scan the photosensitive material 50 through the toroidal lens 48 and the $f\theta$ lens 49 while the material 50 is being transported perpendicular to the scanning direction, whereby a color image is formed on the material 50. Each of the polarizing beam splitters 44a, 44b, 44c is connected to the same drive circuit as used in the first embodiment shown in FIG. 2, and the output from the photosensor 50 is fed back to the circuit. The color laser beam printer further includes density dials for the respective colors, each of which is connected to the corresponding beam splitter drive circuit.

Figure 5:
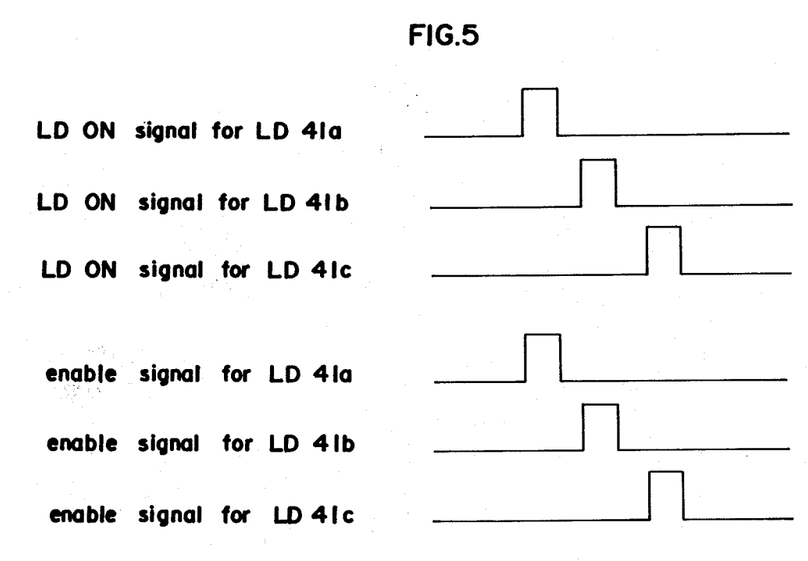
FIG. 5 is a time chart showing emission timing for laser diodes included in the color laser beam printer of FIG. 4.

The operation process for the color laser beam printer is generally the same as the process already described for the first embodiment and therefore will not be described in detail. However, since the color laser beam printer includes a plurality of laser diodes, consideration must be given to avoid the interference between the laser beams in controlling the rotation of the polarizing beam splitters 44a, 44b, 44c. According to the present embodiment, therefore, the emission timing for the laser diodes 41a, 41b, 41c of different wavelengths and the enable signals to be given to the motor drive circuits for rotating the polarizing beam splitters are made out of phase by at least 180° from wavelength to wavelength as shown in the time chart of FIG. 5 to avoid interference between the emissions in controlling the rotation before the image forming process.

Briefly stated, the rotational angle of the polarizing beam splitter is controlled so that the intensity of a laser beam on the image forming surface as detected by a photosensor will be equal to a value set by the operator with a density dial. Accordingly, the desired image can be formed at a light intensity specified by the operator irrespective of the performance of the laser diode light source which differs from lot to lot. The printer of the invention is therefore easier to operate than the conventional one.

Further according to the invention, the intensity of the laser beam is adjustable by an optical filter (polarizing beam splitter in the embodiments) disposed in the optical path, so that the light intensity range is shiftable by a simple arrangement without necessitating a complex video signal generating circuit.

Further according to the invention, the intensity of the laser beam is automatically adjustable before image formation is conformity with a value set by the density dial. This eliminates the need for the operator to adjust the laser beam intensity every time the ambient temperature varies.

Further according to the invention, images are formed invariably at a light intensity specified by the operator, so that the color balance can be adjusted most optimally in the case of the color laser beam printer.

Although the intensity of the laser beam is controlled by rotating the polarizing beam splitter in the optical path according to the embodiments described, this method of control is not limitative but any optical means is usable insofar as it is capable of giving a variable transmittance. Furthermore, the laser light source is not limited to a laser diode but can be a gas laser or the like.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An optical laser beam control device for a printer adapted to modulate a laser beam intensity in accordance with a multi-tone image signal and forming a multi-tone image on a photosensitive material by exposing the laser beam from a laser light source thereon, the optical laser beam control device comprising:
   an optical member mounted on a laser beam path between the laser light source and the photosensitive material, the laser light source transmitting the laser beam through said optical member;
   means for varying the beam transmittance of said optical member;
   means for causing the laser light source to emit the laser light beam at a predetermined intensity level previous to the image formation for adjusting the laser beam intensity on the photosensitive material;
   means for detecting the intensity of the laser beam transmitted through said optical member, and
   means for controlling said varying means in accordance with the intensity detected by said detecting means to adjust the laser beam intensity on the photosensitive material prior to the image formation.

2. An optical laser beam control device as defined in claim 1 wherein said laser light source is a semiconductor laser, said optical member is a polarizing filter, said varying means varies the transmittance by causing said filter to rotate about an optical axis of the laser beam path, and said controlling means controls an angle of rotation of said filter.

3. The invention of claim 1 wherein the optical member is a polarizing filter and the means for varying includes means for moving the polarizing filter.

4. The invention of claim 1 wherein the means for detecting is a sensor for detecting a scan position of the scanning laser beam.

5. An optical laser beam control device for a printer adapted to modulate laser beam intensity in accordance with a multi-tone image signal and forming a multi-tone image on a photosensitive material by exposing the laser beam, from a laser light source, thereon, the optical laser beam control device comprising:
   an optical member mounted on a laser beam path between the laser light source and the photosensitive material, the laser light source transmitting the laser beam through said optical member;
   means for varying the beam transmittance of said optical member;
   means for causing the laser light source to emit the laser light beam at a predetermined intensity level prior to the image formation for adjusting the laser beam intensity on the photosensitive material;
   means for detecting the intensity of the laser beam transmitted through said optical member, and
   means for controlling said varying means in accordance with the intensity detected by said detecting means to adjust the laser beam intensity on the photosensitive material previous to the image formation, wherein said detecting means is a sensor for detecting the timing for starting image formation.

6. An optical laser beam control device as defined in claim 1, further comprising manual input means for manually inputting a density of the image to be formed and wherein said control means includes means for comparing the laser beam intensity detected by the detecting means with the laser beam intensity in correspondence with the density inputted by said inputting means and controls said varying means in accordance with the result of said comparison.

7. An optical laser beam control device for a printer adapted to modulate a laser beam intensity in accordance with a multi-tone image signal and forming a multi-tone image on a photosensitive material by exposing the laser beam from a laser light source thereon, the optical laser beam control device comprising:
   an optical polarizing filter mounted on a laser beam path between the laser light source and the photosensitive material, the laser light source transmitting the laser beam through said filter;
   means for supporting said filter rotatably about an optical axis of the laser beam path;
   means for causing the laser light source to emit the laser light beam at a predetermined intensity level prior to the image formation for adjusting the laser beam intensity on the photosensitive material;
   means for detecting the intensity of the laser beam transmitted through said filter;
   means for manually inputting the desired intensity of the laser beam on the photosensitive material;
   means for comparing the intensity detected by said detecting means with the intensity inputted by said input means, and means for causing said filter to rotate and for controlling an angle of the rotation of said filter for said comparing means to judge when the intensity detected by said detecting means is equal to the intensity input by input means previous to the image formation.

8. An optical laser beam control device as defined in claim 7 wherein said detecting means is a sensor for detecting the timing for starting image formation.

9. An optical laser beam control device as defined in claim 7 wherein said laser light source is a semiconductor laser.

10. An optical laser beam control device for a printer adapted to modulate a laser beam intensity in accordance with a multi-tone image signal and forming a multi-tone image on a photosensitive material by exposing the laser beam from a laser light source thereon, the optical laser beam control device comprising:

an optical polarizing filter mounted on a laser beam path between the laser light source and the photosensitive material, the laser light source transmitting the laser beam through said filter;

means for supporting said filter rotatably about an optical axis of the laser beam path;

means for causing the laser light source to emit the laser light beam at a predetermined intensity level prior to the image formation for adjusting the laser beam intensity on the photosensitive material;

means for detecting the intensity of the laser beam transmitted through said filter;

means for manually inputting the desired intensity of the laser beam on the photosensitive material;

means for comparing the intensity detected by said detecting means with the intensity inputted by said input means, and means for causing said filter to rotate and controlling an angle of the rotation of said filter for said comparing means to judge when the intensity detected by said detecting means is equal to the intensity input by input means previous to the image formation, wherein said detecting means is a sensor for detecting the timing for starting the image formation.

11. In a laser printer having a laser light source with the capacity to modulate the intensity of the scanning laser beam on a recording surface in accordance with a multi-tone image signal to form a multi-tone image, the improvement comprising:

an optical member mounted in the laser beam path between the laser source and the recording surface;

means for varying the transmission characteristics of the optical member relative to the laser beam;

means for setting a predetermined intensity level for the laser beam at the recording surface;

means for causing the laser source to emit the laser beam at a predetermined test level previous to the image formation;

means for detecting the laser beam transmitted through the optical member, and means for controlling the varying means in response to the setting means and the detecting means previous to the image formation to adjust the laser beam intensity on the recording surface.

12. In a laser printer having a laser light source with the capacity to modulate the intensity of the scanning laser beam on a recording surface in accordance with a multi-tone image signal to form a multi-tone image, the improvement comprising:

an optical member mounted in the laser beam path between the laser source and the recording surface;

means for varying the transmission characteristics of the optical member relative to the laser beam;

means for setting a predetermined intensity level for the laser beam at the recording surface;

means for causing the laser source to emit the laser beam at a predetermined test level previous to the image formation;

means for detecting the laser beam transmitted through the optical member, including a sensor for detecting a scan position of the scanning laser beam, and means for controlling the varying means in response to the setting means and the detecting means previous to the image formation to adjust the laser beam intensity on the recording surface.

* * * * *